Inventors
GEORGE A. HOWELLS
GEOFFREY A. HUNT
By [signature]
Attorney

Inventors
GEORGE A. HOWELLS
GEOFFREY A. HUNT
By [signature]
Attorney

Inventors
GEORGE A. HOWELLS
GEOFFREY A. HUNT
By Percy P. Lantzy
Attorney

Inventors
GEORGE A. HOWELLS
GEOFFREY A. HUNT
By Percy P. [signature]
Attorney

Inventors
GEORGE A. HOWELLS
GEOFFREY A. HUNT
By [signature]
Attorney

Inventors
GEORGE A. HOWELLS
GEOFFREY A. HUNT
By [signature]
Attorney

Inventors
GEORGE A. HOWELLS
GEOFFREY A. HUNT
By [signature]
Attorney

DATA PROCESSING EQUIPMENT

Filed Nov. 15, 1965 9 Sheets-Sheet 8

Inventors
GEORGE A. HOWELLS
GEOFFREY A. HUNT
By Percy P. Lantzy
Attorney

DATA PROCESSING EQUIPMENT

Inventors
GEORGE A. HOWELLS
GEOFFREY A. HUNT
By [signature]
Attorney

United States Patent Office 3,411,137

Patented Nov. 12, 1968

3,411,137

DATA PROCESSING EQUIPMENT

George Aneurin Howells and Geoffrey Allen Hunt, Aldwych, London, England, assignors to International Standard Electric Corporation, New York, N.Y., a corporation of Delaware Filed Nov. 15, 1965, Ser. No. 524,998
Claims priority, application Great Britain, Nov. 16, 1964, 46,533/64
7 Claims. (Cl. 340—172.5)

ABSTRACT OF THE DISCLOSURE

Data processing equipment whereby single faults in the address register and associated circuitry, in the decoder circuitry, or in the circuitry of the main store selection system, are by-passed by complementation of the original binary data, with said complementation taking place automatically whenever a fault is disclosed by detection means including current measuring circuitry and an encoder.

Figure 1:
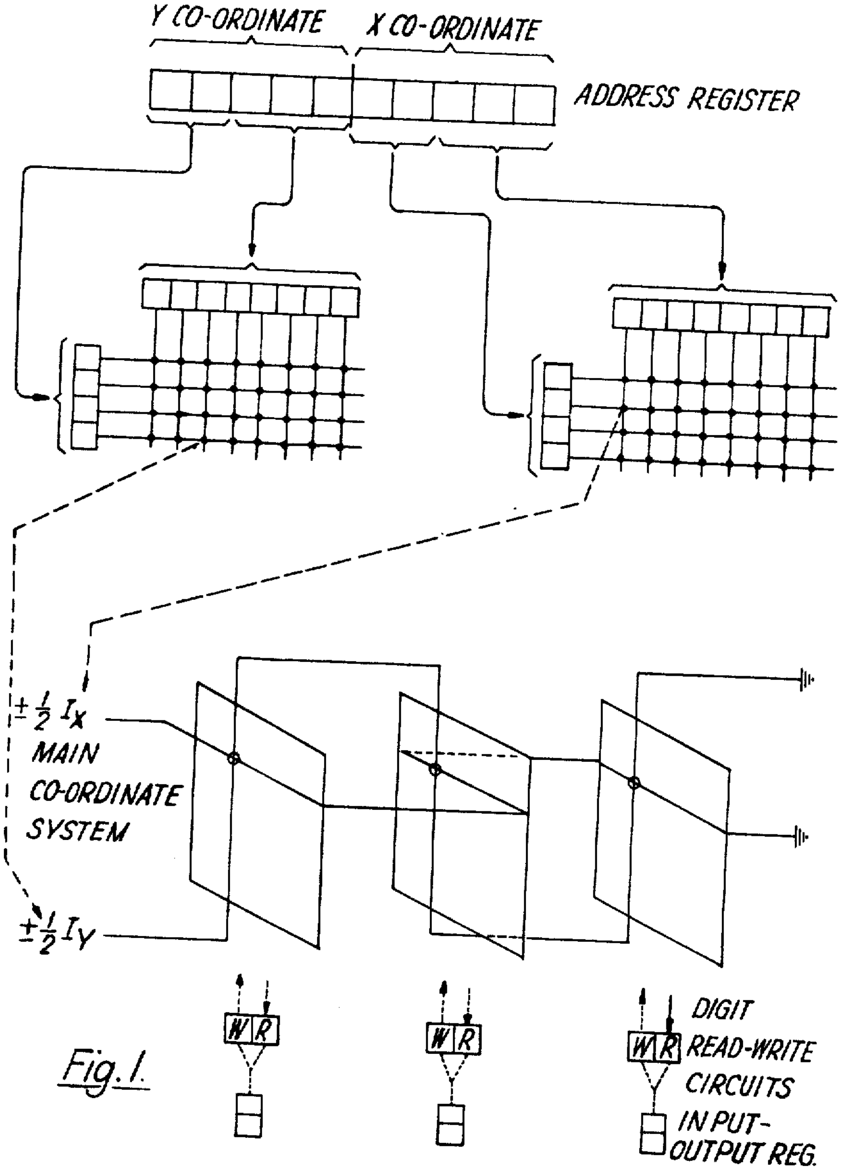

This invention relates to data processing equipment, and in particular to electronic digital computers.

The design of data processing equipments is directed towards one or more specific requirements, such as speed of operaiton, data handling capacity, flexibility of operation, size and reliability. The development of any of the first four requirements is usually consistent with an increased reliability problem.

A digital data processing equipment such as a computer comprises three essentials:

(1) Data transfer from one section of the equipment to another.

(2) Data processing function equipment, i.e., adding, translating, checking.

(3) Data storage.

It will be assumed for the purposes of this specification that in any portion of a data processing equipment not more than one fault will appear at any one time. Experience has indicated that this is a reasonable assumption to make, providing that rapid rectification is possible and also that if such single faults can be averted or circumvented the operation of the equipment need not be immediately interrupted. This last point is based on the assumption that faults are comparatively infrequent and therefore the probability of a second related fault occurring before the end of the current program may be small, and that an equipment shutdown can thereby be deferred.

It is also assumed that, in a complex data processing equipment such as an electronic computer, provided the data originally supplied to the equipment is correct then any error in the data flowing at any point in the equipment arises out of a fault in the equipment. It is not practical, if indeed possible, to check the operation of each component other than by examining the data at various points in the data flow and detecting errors in the data which are indicative of a fault in the equipment. Provided that the data is in a suitable binary form, such as a Hamming code, it is also possible to locate accurately the position of the error in the data and to initiate the appropriate correction.

According to the invention there is provided data processing equipment including a store, a decoder, a register for holding an address to be decoded by the decoder, a matrix of switches controlled by the decoder, means for detecting an error in the decoder output or the matrix, means for providing an alternative address, means for decoding the alternative address and means for selecting a correct one of the two alternative decoded outputs.

In a preferred embodiment of the invention the alternative address is derived from the original address. In one embodiment the alternative address is decoded in the same decoder as the original address.

The invention is particularly suitable where the data is binary digital data in which case the alternative address can be derived by complementing (as hereinafter defined) the original address.

The term "complementing" as used in this specification refers to the process of reversing the digital value of each individual digit in a portion of digital data. Thus in a binary digital code group all the 1's are turned into 0's and vice versa when the code group is complemented. A code group 1101 is said to be the complement of the group 0010.

It is fairly obvious that a fault in the address register decoding units, pulse generators or switches will give rise to some malfunctioning of the main coordinate system associated with the storage medium. It is vital that the accessing co-ordinate currents when applied concurrently are flowing through correctly selected wires and have amplitude and durations within the specified limits. If these conditions are not satisfied, information stored in the non-specified locations may be destroyed, new information may be incorrectly stored, and stored information incorrectly read.

These possibilities exist not just for one bit per word, but for all bits so that correction by some coding method is not possible. Thus methods must be found for establishing that the necessary conditions are fulfilled, and also, methods for correcting or by-passing faulty units.

It appears that a difference exists between a reading and a writing operation, in that provided the information is retained, a second writing action can successfully be initiated after fault correction has taken place.

In the case of reading one completed, but incorrect, reading operation destroys the required information. However, the danger of excess amplitude currents and misdirected currents in the main co-ordinate system applies equally to both reading and writing operations.

It is essential, in both cases therefore, that ways be found of establishing that the correct currents will flow through the required store co-ordinate wires before they are finally used for changing the state of the storage medium.

Figure 2:
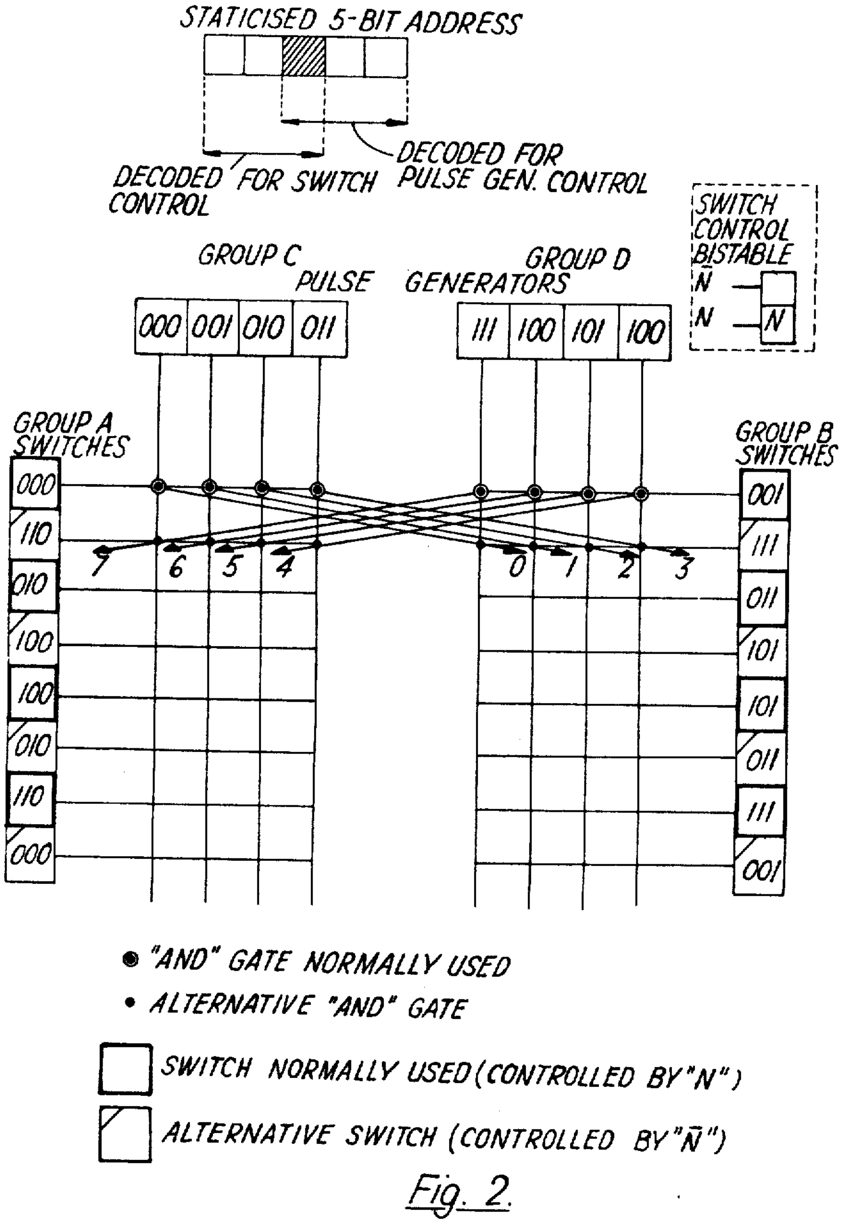
Figure 3A:
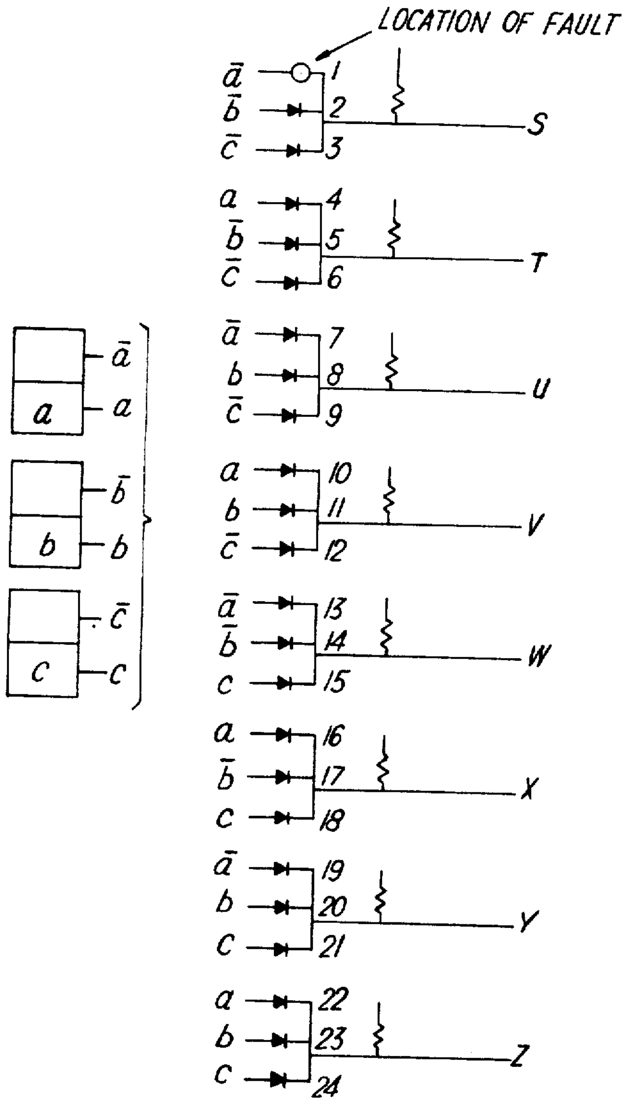
Figure 3B:
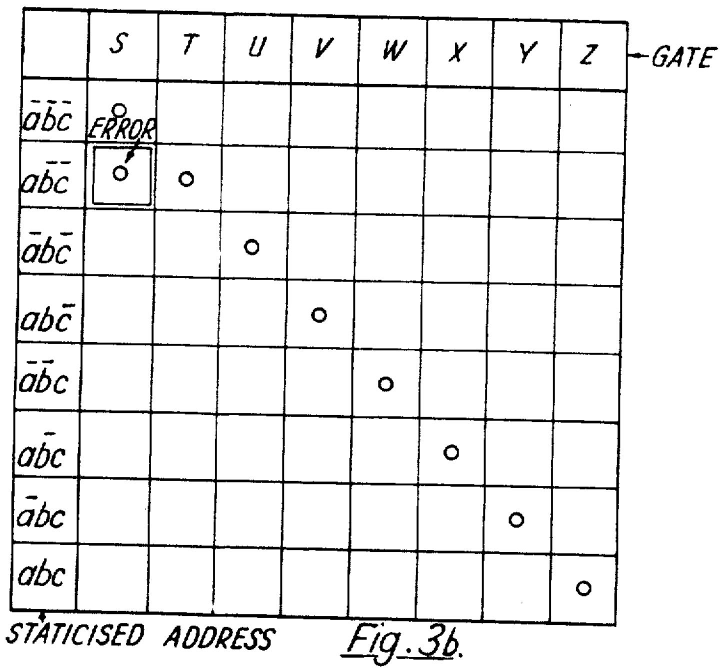
Figure 3C:
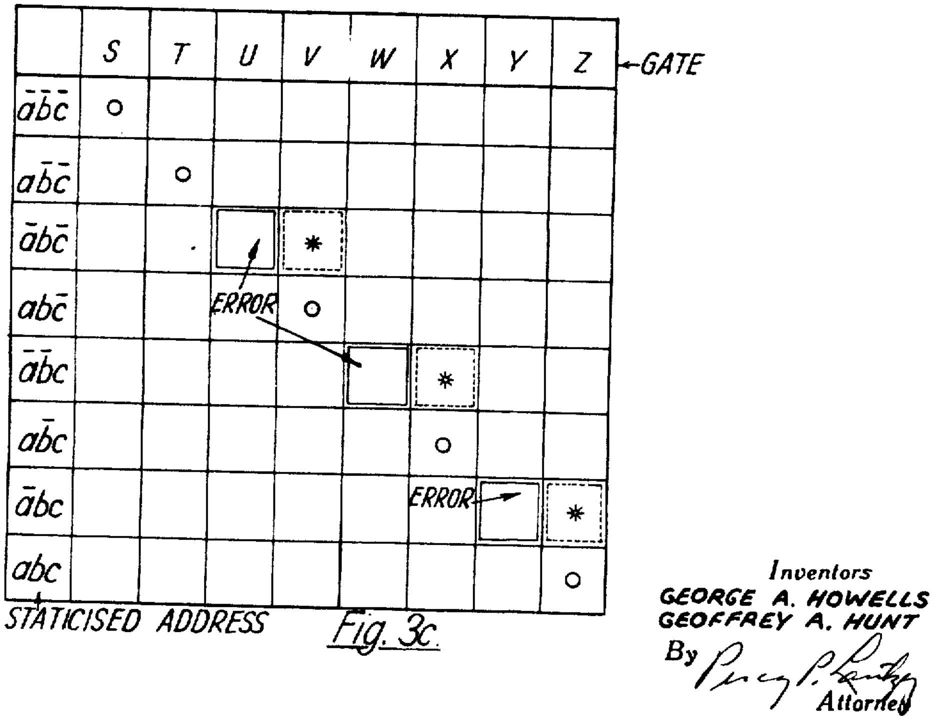
Figure 3D:
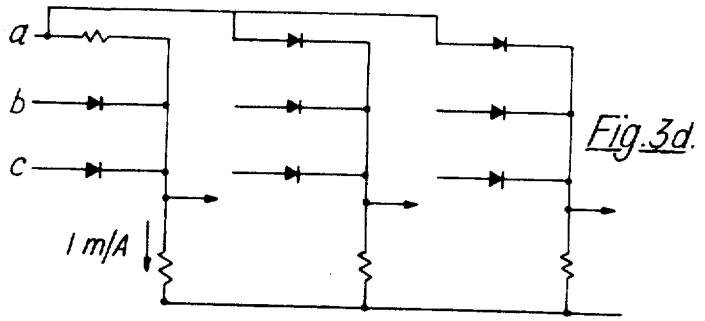
Figure 4:
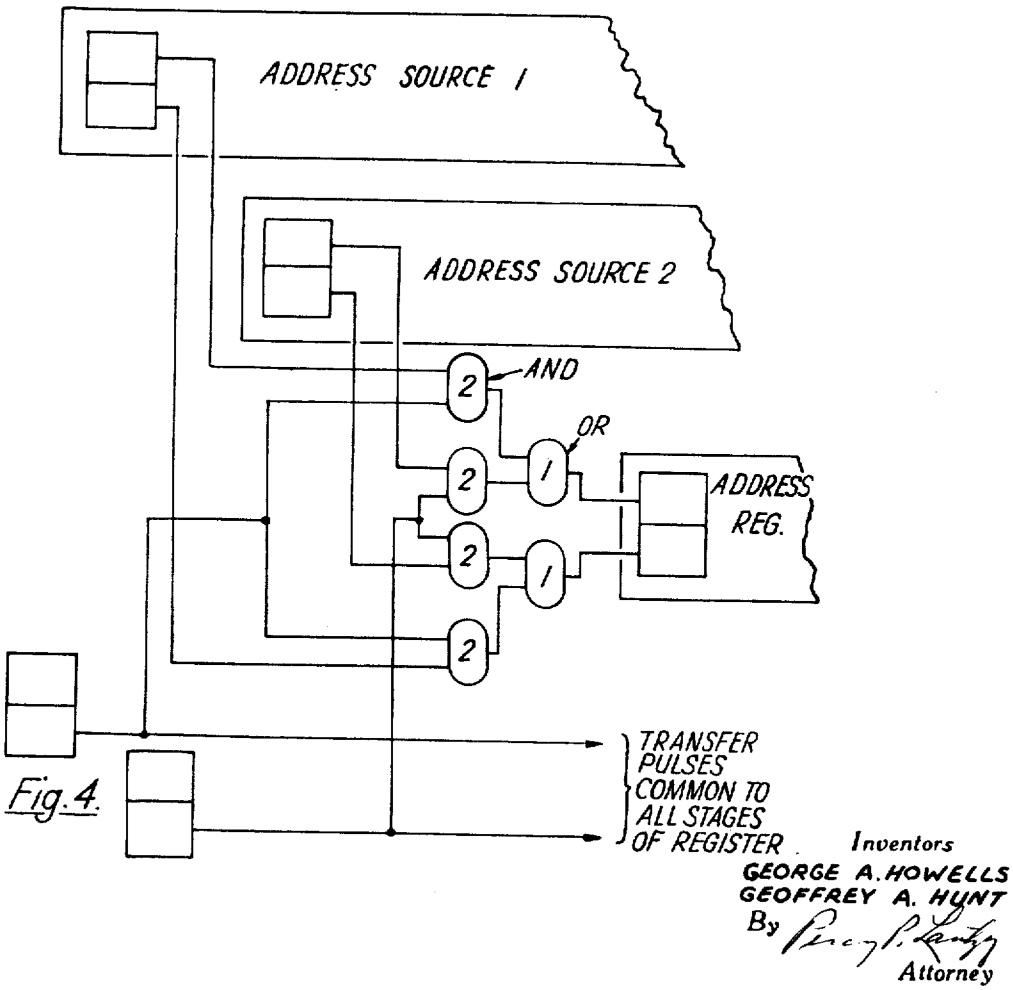
Figure 5:
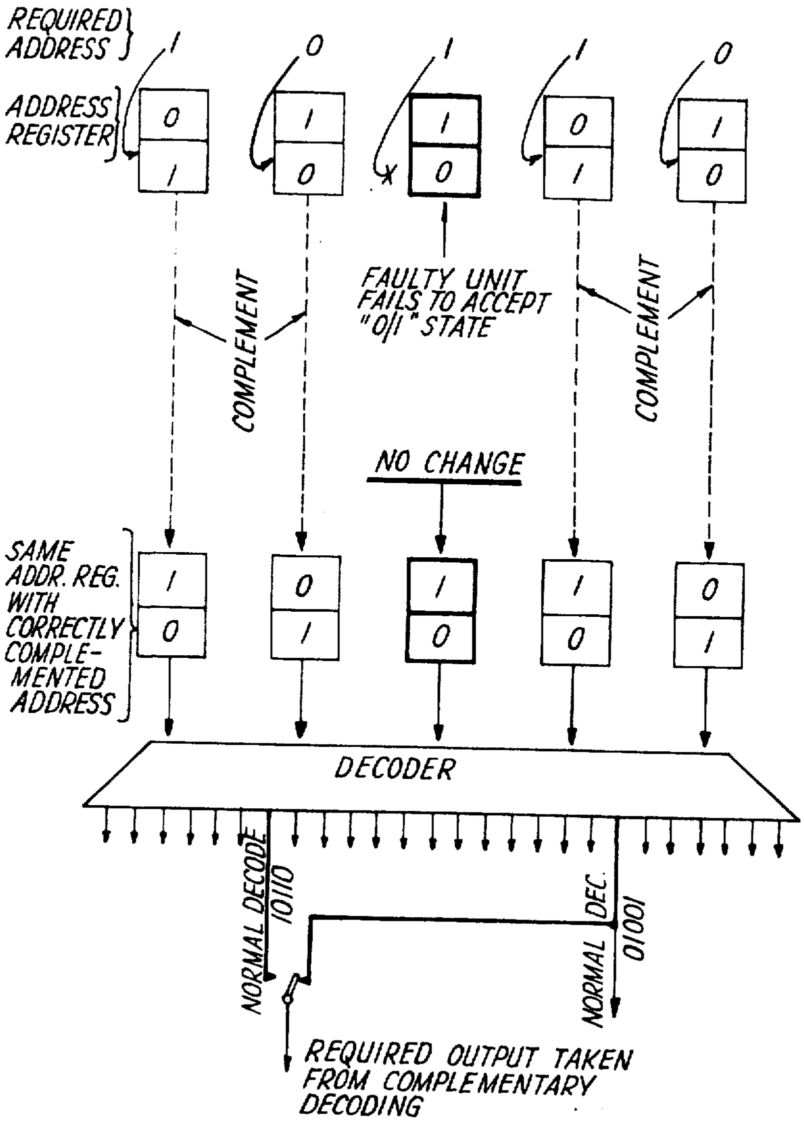
Figure 6:
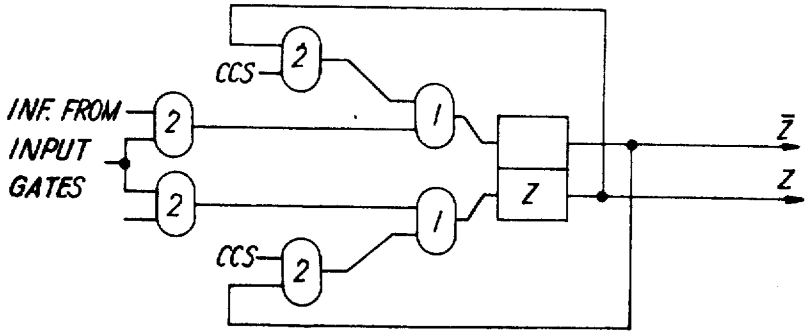
Figure 7:
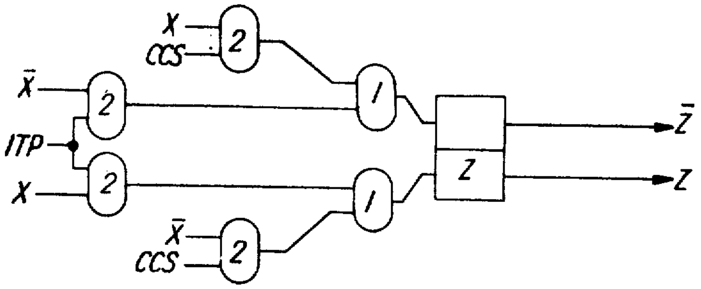
Figure 8:
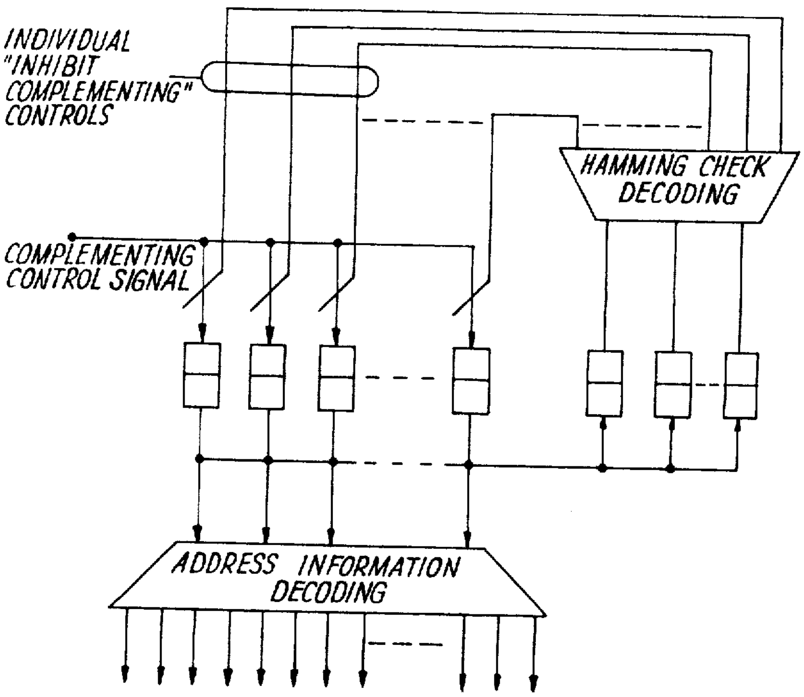
Figure 9:
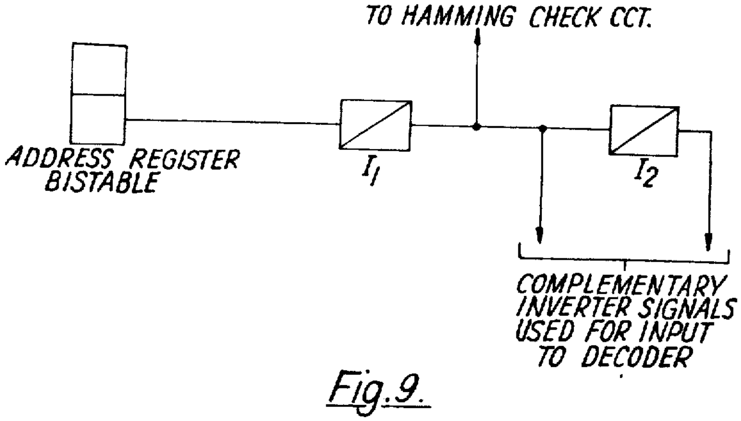
Figure 10:
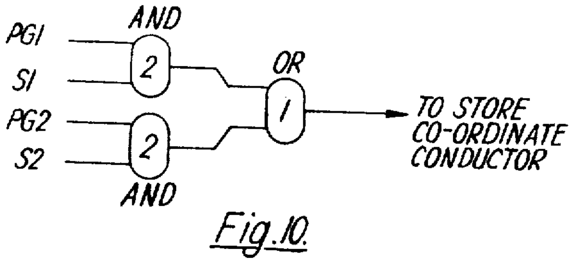
Figure 11:
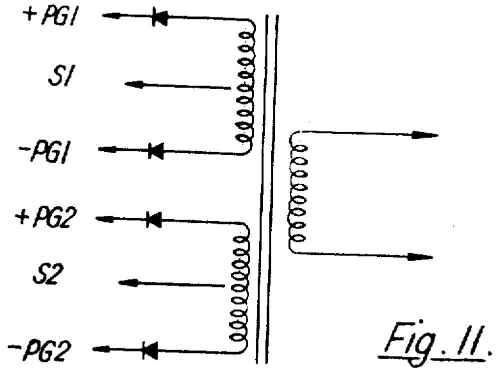
Figure 12:
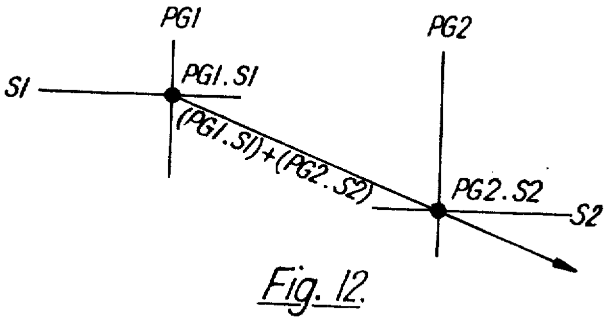

The above and other features of the invention will become more readily apparent in the following description of the invention with reference to the accompanying drawings, in which:

FIG. 1 is a block diagram of a matrix store address system,

FIG. 2 illustrates schematically an access system for a co-ordinate matrix store with alternative isolated routes to each co-ordinate conductor, FIGS. 3*a*–*d* illustrate schematically a 3-variable decoder utilising diodes and resistors, and the results of three types of fault therein, FIG. 4 illustrates the input gating for one stage of the address register associated with the store, FIG. 5 illustrates the effect of complementing a binary coded address, FIGS. 6 and 7 illustrate alternative methods of complementing a binary code, FIG. 8 illustrates the use of error detecting and correcting digits for a complemented binary code, FIG. 9 illustrates the use of buffers for an address register bistable, FIG. 10 illustrates the logical representation of a method of providing alternative correct routes, FIG. 11 illustrates a current "OR" gate, with 2 AND gates on the primary side of the transformer, FIG. 12 illustrates an alternative representation of logic operations.

A typical system diagram for the storage system is given in FIG. 1.

The address of a particular storage location or "word" in a matrix store is given by a two-part binary code group held in the address register. Since the location of an element in a two dimensional matrix is defined by the intersection of two co-ordinates the two parts of the address correspond to the identities of the two co-ordinates, known as the X and Y co-ordinates respectively.

The X or Y co-ordinate portion of the address is subdivided into two parts, which together define one of X or Y a number of co-ordinate wires respectively. Thus the Y co-ordinate part of the address, for example, is divided into two portions, each of which is separately decoded and applied to a selection matrix on one of two co-ordinates. The resultant intersection defines the Y co-ordinate wire in the main store, as illustrated in FIG. 2.

It will now be shown how, in the event of a single fault in the system made up of address register, decoder, pulse generators, switches and interconnections, alternative routes to a desired co-ordinate wire can be provided, thus by-passing the fault.

A logic diagram of the proposed method for one co-ordinate of the complete access system is given in FIG. 2. The case considered is that of a five-bit address controlling one co-ordinate. The address is split into two parts comprising the 3 least significant and the 3 most significant digits of the address. Note that these overlap. This is a means of providing adequate controls for the pulse generators and redundant switches.

Before proceeding it is convenient to be able to represent the AND/OR arrangements of FIG. 2 by the method shown in FIG. 12, where the horizontal and vertical lines are the outputs of switches and pulse generators respectively.

The symbol ● at the intersection of the horizontal and vertical lines represents the AND operation with reference to the switch and pulse generator connected to the lines. The oblique lines represent the OR function, and the arrow points to the selected conductor of the main co-ordinate system.

Both sets of the Y co-ordinate bistables of the address register are decoded by 8 AND gates (as shown in FIG. 3*a*) providing two sets of 8 decoded outputs.

The decoder outputs are applied, in conjunction with one or other of the outputs of a bistable ("N" in FIG. 2) to control the selection of the required switch and pulse generator. The bistable "N" governs the selection of the normal or alternative current route, its state being dependent on the presence of fault conditions in various parts of the store.

Referring to the current logic gates it is convenient to designate the current AND gate used during normal fault free conditions by a circle around the AND symbol.

It is necessary now to examine the conditions that exist in the presence of a fault. Sources of error will be outlined below and it is assumed in the following that only one fault exists at a given time. It is assumed also at this stage that means exist for indicating that the correct current is flowing in the selected co-ordinate conductor, and for indicating that current is flowing in unselected conductors.

Suppose access to co-ordinate output 7 is desired. The contents of the address register in this case are 00111 and the output is normally selected by pulse generator 111 and switch 001. If either selected generator or switch is only partially closed or is open circuit an abnormal output current flows in the selected co-ordinate conductor; and this as postulated can be detected. An alternative route exists, however, for accessing the co-ordinate conductor by energising pulse generator 000 and switch 110$\overline{\mathrm{N}}$ ($\overline{\mathrm{N}}$ indicating not normally used switch). This requires a different output from the decoder.

The complementary address has been chosen as an alternative address, but other systems for address changing are possible.

If any of the unselected switches in the B group are closed or partially closed then the available current from the pulse generator 111 is distributed between the selected switch and the faulty switch giving rise to low output currents in two output co-ordinate conductors; and this again can be detected and the alternative path selected.

Similarly if any of the other pulse generators in the D group are partially or fully on, excess current flows in the selected conductor; and the abnormal state can be detected and again the alternate path used.

Similarly, any malfunctioning of the AND gates, if they are of the type shown in FIG. 11, such as faulty diodes or open circuit transformer primary windings, will cause abnormal outputs.

It appears therefore that effective isolation of at least one fault involving switches and pulse generators, and certain faults in the transformer OR gate can be achieved.

It is apparent from the above that when a fault exists in either half of the access system, then for half the addresses use must be made of the alternative route. To avoid loss of time in repeatedly detecting the presence of a fault it may be advantageous to memorise its location as being in one or the other half of the store; the need for switching can then be determined immediately the address enters the address register, by ascertaining whether the new address would normally make use of the faulty area.

The optimum distribution of redundancy between switches and pulse generators is dependent on store size.

Error detection in the co-ordinate access system can be done using an encoder.

This method makes use of the co-ordinate current resulting from an original input address and subsequent decoding, for setting up the address of the selected co-ordinate conductor in a new bistable register. The contents of the new register are compared with that part of the store address register responsible for specifying the co-ordinate conductor in question. Disagreement indicates some malfunctioning of the addressing system (e.g., the decoder). If the contents of both registers are identical, then a single current measuring unit is sufficient for determining whether the co-ordinate current is within specification.

One of the problems with this system is the design of the encoder. This needs to be sufficiently sensitive to respond to current amplitudes of approximately 10% nominal value to detect partial selection conditions.

Alternatively the error detection may make use of multiple current measuring circuits.

It is assumed in the following that a pulse generator is a source of current of defined amplitude and that a switch is merely a current sink. Thus if conditions are such that more than one switch can form a closed circuit with a pulse generator, the available, defined, current sub-divides between the two switches. On the other hand, if conditions are such that more than one pulse generator can form a closed circuit with a switch, the switch current will be in excess of the normal defined value.

Suppose now that for the case of a 32 co-ordinate output system addressed by a 5-stage bistable register, a current measuring circuit (denoted by C.M.C. in all that follows) is associated with each group of 4 output circuits. Referring to FIG. 2, a C.M.C. is associated with outputs 0–3, 4–7, etc. The specification for the C.M.C. is that when interrogated it can provide indication that the current flowing is within permitted limits. Thus under normal fault free conditions output, the current of circuit 7, for example, when selected by operating switch 001, is within specification. Single unit faults which can give rise to incorrect operation are limited to the half of the co-ordinate system being used, in this case the "D" group of pulse generators and the "B" group of switches.

Obviously, an open circuit in a selected pulse generator or switch will be detected by the associated C.M.C. If any other pulse generator in the group is incorrectly in the energised state, the total current in the selected group will be in excess of normal and the condition will be detected. Similarly, if any other switch in the group is incorrectly in the energised state, the total current in the selected group will be below normal, and current will be detected in an unselected group. The fault condition is again detectable.

The outcome is, that for single faults considerations, provided the C.M.C's detect the presence of a current within specification in one group of output circuits only, and no current in all other groups of output circuits, then the used part of the access system is functioning correctly.

In the event of malfunction of the C.M.C. the normal remedial action of using the other half of the selection system fails to clear the condition. In this case it appears that the alleged fault conditions existing before and after switching should be interpreted as "no fault present" in the access system. Inherent detection of faults in the fault detection system thus seems feasible.

For reasons outlined elsewhere it is necessary to assess whether a writing or reading operation can be completed correctly before the operation is permitted to take place, or at least, before any stored information is irretrievably erased from the selected location or other unknown location. A scheme which to a large extent satisfies this requirement is given below.

A method is required for diverting the co-ordinate current from the selected output circuit until its value has been measured. Difficulties arise in finding a solution without introducing considerable extra equipment which introduces further problems when it fails. The following solution is based on the idea that the positive and negative current pulse generators of a selected pair should function as a current sink for each other. If all equipment is functioning correctly then energising both generators concurrently results in only the small difference in the amplitude of $+\frac{1}{2}I$ and $-\frac{1}{2}I$ co-ordinate currents flowing in the output circuit.

If either pulse generator is open circuit the normal $\frac{1}{2}I$ will be detected by a common C.M.C for each co-ordinate of the store and is indicated as a fault. If an unselected pulse generator forms a closed circuit with the selected switch, then here again a relatively large current flows in the corresponding co-ordinate output circuit and is indicated as a fault by the C.M.C.

A problem arises when the selected switch is open circuit or has a high impedance; and when an unselected switch is not fully open circuit and forms a closed circuit with the selected pulse generator. To detect the former condition it is sufficient to introduce one C.M.C. in the common return path of all of the switches in one bank (e.g. group B in FIG. 2), and to establish that the presence of a current of amplitude I is the sum of the half currents. This is insufficient to satisfy the latter condition for the available pulse generator currents are shared between two switches but the sum is I and an error is not indicated. Therefore resort has to be made to the methods indicated earlier. That is, introducing C.M.C.'s in the common return path of switches with outputs 0–3, 4–7 etc., or by making current dependent on the impedances of the switches and generators in circuit. The scheme thus requires:

(1) One C.M.C. for monitoring the combined outputs of one co-ordinate indicating the presence or absence of current.

(2) A C.M.C. monitoring the combined current in the switches associated with each of the output groups 0–3, 4–7 etc.

(3) One C.M.C. for monitoring the amplitude and possibly duration of the sum total current flowing through the switches.

Consider now the information transfer circuits. Since the $n$ read/write circuits per word are substantially individual units (excluding common pulse generators) faults in individual units give rise to one faulty bit per word only. This contrasts with faults in the co-ordinate address circuits. Because of this the use of auxiliary error correction bits in each word, using for example, a Hamming Code, can be considered.

The effects of specific types of fault in a normal decoding system using diode coincidence gating will now be considered with reference to FIG. 3*a*. A simple case, decoding three address bits to eight outputs, will be examined.

Each selection is obtained by the use of three diodes and a resistor. Buffering will not be considered at this stage. Faults which will be examined are the results of:

(a) Open circuit diodes.
(b) Short circuit diodes.
(c) Open circuit resistors.

In FIG. 3*a* a 3-variable decoder is shown in which diode No. 1 will be assumed to be open circuit.

The table in FIG. 3*b* shows the effect of presenting such a faulty decoder with the eight possible address combinations in turn.

Note that errors are confined to the faulty gate, and that in fact only one error occurs—when an address is presented which is identical with that represented by the faulty gate, except in the variable corresponding with the open circuit diode. Under those circumstances the correct gate opens, corresponding with the selecting address, but in addition there will be an erroneous output from the faulty gate. For all other addresses the decoder will produce the correct outputs.

Now, in FIG. 3*a* assume that diode No. 1 is short circuit.

The table in FIG. 3*c* shows the effect of presenting this decoder with the full range of eight addresses.

In this case there is the possibility that feedback through the short circuit diode can, in some cases, result in a source address bistable having its state inverted.

For example if the source address is "$\bar{a}$, $\bar{b}$, $c$," the address output "$\bar{c}$" will be "up." Initially, gate W would tend to go "down"—incorrectly—but the action of the faulty gate S must be observed. Here, since "$\bar{c}$" is "up" and there is effectively no diode at "$\bar{a}$," the point marked "1" would also be "up." This is the output from the "$a$" address bistable, which has been set "down" by the input address. This conflict could cause the state of bistable $a$–$\bar{a}$ to reverse giving the new (faulty) address "$a$, $\bar{b}$, $c$." All gates except that appropriate to the new, incorrect, address would then be held "up," and a simple, $1/n$, incorrect selection would result.

If however the bistable did not switch to the reverse state, the result would be to inhibit all gates—a $0/n$ selection.

It is felt that bistable switching due to feedback will probably be inhibited, in practice, by the necessity for buffering the bistable outputs for loading reasons. In the case considered, then, this would be equivalent to the bistable $a$–$\bar{a}$ having effective logic outputs of zero on both sides.

Unlike the open circuit diode case, more than one address will result in error. Of the total number of decoding gates, half will contain an input equivalent to that represented by the short circuit diode. All the corresponding addresses, except that appropriate to the faulty gate itself, will result in erroneous selections. The remaining half (i.e., those which contain an input corresponding to the inverse of the variable represented at the faulty diode) will result in correct selection.

As in the case of open circuit diodes there is no feedback affecting other parts of the decoding system.

The result of an open circuit resistor is, essentially, to hold the associated unit closed—or to slow its operation down to the point where for most purposes it is effectively closed for a significant part of the operative time. Thus, in a decoder similar to that shown in FIG. 3*a* the result of one open circuit resistor will be to give one error—no selection—when the address corresponding with the faulty gate is applied. All other addresses would result in correctly decoded outputs. This is illustrated in FIG. 3*d*.

While of course this condition can arise, it is not considered to be a sufficiently likely fault to warrant special consideration.

Examination of the tables in FIGS. 3*b*, 3*c* and 3*d* will show that, for any of the types of fault which have been considered, if an address is supplied which is complementary to that appropriate to the faulty gate, no error occurs—the complementary address is correctly decoded.

Suppose, for example, the address "$a.\ \bar{b}.\ \bar{c}.$" were presented to the decoder having an open circuit diode at point 1 in FIG. 3*a*. Output wires S and T would be energised; (S in error). Inversion of the address to "$\bar{a}.\ b.\ c.$" would result in output Y *only* being energised.

Thus, if means are provided for detecting a fault in the decoder, of complementing the address, and of using this complementary decoding to make the selection initially required (as an "or" function with the normal decoding) the fault condition can be by-passed and errors eliminated.

It would now be assumed that the store address register consists basically of a set of bistables—one bistable for each binary digit of the address—and that the register will be required to accept new addresses in parallel from one or more sources under the control of an "and-or" gating system, as shown in FIG. 4.

The input gating signals fall into two categories—the parallel transfer pulses, which are common to *all* bistables of the address register, and the information (address digit) signals, which are specific to individual bistables.

Thus, a failure in an *information* signal path may cause a single bistable to be incorrectly set, while a failure in a transfer pulse path may cause multiple address digit erorrs.

However, protection of transfer pulse signals can be achieved, for example by redundancy and majority voting, in such a way that any simple fault will result in no more than one digit being in error.

It is possible that a bistable could develop a fault causing it to lock in the "0–1" or "1–0" state, and fail to change its state when required by correctly functioning input gating. This of course, produces a similar situation to that caused by input gating failure, except that, in the case where the bistable "locks," no duplication of, or redundancy in, the input gating could bring about acceptance of the required data.

Another type of fault is the case where a bistable locks into the "0–0" or "1–1" state.

If a bistable locks in the "1–0" (or "0–1") state, as shown in FIG. 5, and the information it is required to contain is "1–0" (or "0–1" respectively) no fault can be detected and no error will occur. But it cannot record the complementary information. If it is required to do so an error condition must result. In such an event if all the *remaining* bistables of the register (which have been correctly set) are then complemented, the complete register will contain correct but complemented information throughout.

Failure of an address register bistable to switch may be the result of a weak triggering pulse due to loading, or the result of faulty operation of one of its input gates. If the latter were the case, and complementing was then accomplished by cross-coupling each bistable output to form its own complementary input, as shown in FIG. 6 then the situation might arise that the erroneously set bistable would *also* switch; the complement would then still be wrong. One way of overcoming this danger is to arrange for complementing to take place by re-input, in the inverted sense, from the original source. This has the disadvantage of being rather uneconomical in gating if multiple inputs are involved. FIG. 7 illustrates this case.

A better system shown in FIG. 8 is to arrange for the address to be supplied in the form of a Hamming Code group, in which the checking bits are used to generate a control which inhibits, for the faulty unit only, the effect of the complementing signal being applied to all units of the register.

Faults which cause bistable circuits to lock in the "0–0" or "1–1" condition are considered to be unlikely. However, these faults could be corrected as follows:

In all probability address register bistable outputs will require buffering. If this is done by two inverters in series, from one output of each bistable, and these signals applied to the decoder are derived from the inverters as shown in FIG. 9, then even though the bistable locked symmetrical the inverters would supply either correct, or correctly complemented information. A Hamming check on the outputs from the first inverters ($I_1$) of a register organized in this way could be arranged to detect, and correct by complementation, errors resulting from this type of fault.

A further case will be considered. In the bistable-inverter combination just described, it is possible for either of the inverters to fail. If the first inverter should fail then the Hamming check could detect and correct an error in the same way as for a bistable fault. In the event of the first inverter functioning correctly while a fault existed in the second ($I_2$), both inverters could have identical outputs ("0–0" or "1–1"). This would not be indicated by the Hamming check, but would be indicated in the same way as a decoder fault, by the "$1/n$" decoder detection circuit. This would initiate complementation of *all* bistable units (none being inhibited by the Hamming check circuit output controls) and again correctly complemented information would result.

Whereas a bistable circuit in many cases consists basically of two inverter circuits, cross-coupled, the additional inverters of FIG. 9 have no attached trigger circuits and can have separate physical locations and power supplies; they thus seem less likely to exhibit the condition where the two outputs are permanently locked in the same phase.

It has been shown that the decoder faults which have been examined may result in:

(a) $2/n$ selections (open circuit diode).

$0/n$ selections (open circuit resistor).
$0/n$ selections (short circuit diode, if feedback does not cause address switch).

Clearly, a device capable of detecting "one, and only one, out of $n$" will enable these faults to be picked up.

(b) $1/n$ selection (incorrect—if feedback through s/c diode causes the address to change).

This type of fault cannot be detected in the decoder itself. The feedback effect can be inhibited by diodes on the address bistable outputs; in practice it will probably be inhibited by the need for buffering the bistable outputs. Failing this detection will be achieved in any case as an address fault, as described below.

Faults which cause error in the address register are those which result in an incorrect address being set, either through bistable failure, input gating failure, or a certain type of decoder failure which has already been mentioned. Redundant bits can be used, in the form of a Hamming code, applicable specifically to the address, to detect address faults. It is probably preferable that the address register should be capable of storing these extra bits as well as the address information (rather than that they should be simply transferred to the checking circuit from the source) as they will then be available to check the correctness of *complementation* when this is carried out. Such a check is valid on both "normal" and complemented information.

In the event of any of the above checks failing, whether these are applicable to the decoder or to the address register the method of effecting correction is to complement the contents of the address register.

If the fault has been detected by the Hamming check on the contents of the address register, the check number so generated should be applied to the address register to inhibit complementation of the corresponding unit.

If the Hamming check does not fail, any fault which is detected must lie beyond the address register; in this case *all* address register bistables will be complemented.

The result of complementation will be to by-pass faults in the ways that have been discussed, to produce a complementary decoder output which will be reorientated to the required selection at a later state as illustrated in FIG. 5.

Consider now the problems of faults occurring in the selection system for the main co-ordinate store matrix, and in particular, with faults in pulse generators, switches and their interconnection. It is assumed that the address register and decoding unit is functioning correctly so that only the required switch and pulse generator are selected.

It follows from the above that faulty operation can arise for the following reasons:

(a) Selected pulse generator remains open circuit or gives limited output when energised.

(b) Selected switch remains open circuit or is only partially closed when energised.

(c) Unselected switches which can form a complete circuit (i.e., current AND gate) with the selected pulse generator are partially closed or closed.

(d) Unselected pulse generators which can form a complete circuit (i.e., current AND gate) with the selected switch are not cut off.

(e) Faults associated with the access-system co-ordinate current AND gates. In the case of the typical circuit of FIG. 11 these are short or open circuit transformer windings, and faulty diodes.

(f) Open circuits or short circuits associated with the transformer secondary and matrix co-ordinate conductor.

(g) Faults associated with any additional equipment used for protection—for example, current measuring devices.

One solution to the problem is based on the use of a gating system whereby the co-ordinate drive currents of the store can be generated by two switching systems whose only region of coupling is an OR gate which transmits the current from the chosen system to the output line. The logic representation is indicated in FIG. 10. In the method to be described an OR function is realised by multiple windings on the AND gate transformer as indicated in FIG. 11. Each centre tapped winding is driven in the standard manner by pulse generation and switches. Single faults which cannot be by-passed are limited to faults (*f*) above the short circuit primary windings. The alternative representation of the AND/OR arrangements of FIG. 10 have already been illustrated in FIG. 12.

It has been shown that faults in the address register and decoder can be by-passed, since they have been detected, by complementing the address. Also, in the main store-selection system means of access to the required cores can be obtained by the use of alternative switching arrangements which can be operated by complementary addresses. In addition, practical error detection methods in the store have been described which can be used as an indication that a fault in the basic access system has occurred, indicating the necessity for switching to the alternative access route. It should be noted that these latter store access error detection methods incorporate means of detecting whether one, and only one, selection has been made in each of the main co-ordinate systems. If only one selection has in fact been made for each co-ordinate, this must imply that the initial decoding has been carried out correctly, since single decoding faults have been shown to result in a "0/*n*" or "2/*n*" selection (except in the one case where the decoding fault is detectable in the address register). In other words, the "1/*n*" detection used in the store can also be applied to check the functioning of the decoder.

It is now evident that these proposals can be combined to form a unified fault-detection and error-correction system.

Any single fault within the categories discussed, either in the address register, decoder, or main store selection system, can be by-passed to give error-free operation, if the initial address is complemented and the complemented decoding thus achieved is used to energise the alternative store access switches associated with the required core selections.

The additional cost involved in attaining this degree of protection lies essentially in the equipment used for the Hamming check in the address register—and facilities for the complementing operation—in the alternative switching equipment in the store access system, and in fault-detecting current-measuring circuits.

It will be appreciated that the same results can be achieved by duplication of the address register and decoders, with OR gating to select the correct output. In this case complementation can again be used to provide the address for the second set of equipment. Alternatively two completely independent address sources can be used ab initio.

Now consider the transfer of information to and from the storage medium via the input/output register digit writing circuits and digit signal amplifiers. As stated previously the problem here is different from those associated with the access system, in that a fault associated with one of the digit circuits causes error only in that digit position, except for possible errors associated with common timing pulses. A solution here is not to provide alternative circuits for use in fault conditions but to use additional coding bits for error detection and correction. The Hamming code seems ideal for single error detection and correction.

The following remarks are related to the application of the method to transfer to and from the store.

It is assumed initially that the store input/output regiser has the necessary equipment to provide indication of the faulty digit position. Suppose the input information is correct and transferred in parallel to its register which however has one faulty bistable. The result is that the information in the register may be incorrect and that although the position of the faulty bit is known, corrective action is not possible. Thus the stored word also has one bit possibly in error, but the necessary redundancy bits for correction are present. The same state in the store could result from a faulty writing circuit.

On reading therefore, the output register may contain one digit in error due to faulty bistable, writing circuit or reading amplifier. When the bistable register and correction circuits function correctly the error can be eliminated. When however the register is at fault the information has to be transferred to the next register with error included. Thus since the latter case inherently has to be dealt with by the receiving register, error correction in the store register is optional.

Consider now the case where a number of faulty writing operations have taken place before an error has been detected on reading during normal machine operation (or possibly by a diagnostic program). The situation then is that a number of locations in the store have one bit in error and the number of such locations will increase during diagnostic and fault elimination periods as well as during normal operation. These locations may not be interrogated in the normal course of events for lengthy periods during which another fault in another digit may occur so that two errors may arise in the output. Some corrective routine has then to be completed as soon as possible after elimination of faults. This entails cycling the whole store and performing read, correction, and write operations for each location, since locations in error may be distributed throughout the store. Thus means for correcting the output register are necessary, but this could be achieved by transferring the contents to another register having correction facilities (e.g., arithmetic register) and transferring back again to the store register.

The introduction of digit write current detectors for each digit is expensive and can only provide a silghtly earlier indication of fault conditions. Storage of words containing one bit possibly in error continues for the period of fault elimination. Such a scheme seems to have very limited value.

It appears from the above that error detection and correction circuits for the storage transfer register can be omitted, but the resultant increase in equipment in which only a single fault can be tolerated increases the probability of a second fault during fault elimination periods.

Also, in the event of a failure in any one of the digit circuits, the word transferred to a subsidiary register will possibly have an error in that digit position, the position of which will be determinable by the code in use. Diagnostic routines in this case can only locate the fault as having occurred in any one of the units of that particular digit channel, from the register in question back to the store and the store input gates. Practical fault elimination is thus more difficult.

On the other hand, as a possible alternative to providing error detection and correction facilities for two concurrent and local faults, it is feasible to apply the complementation technique to the store output register before transfer to the next state i.e. information is transferred complemented but free of error. This method requires the use of a tag bit specifying this, but would permit error conditions in both store register and receiving register concurrently. This reduces the probability of a second failure during the fault elimination period by reducing the amount of equipment in which the second fault can occur. Some further improvement seems possible by attempting to store the information in complementary form in the store register.

It is to be understood that the foregoing description of specific examples of this invention is made by way of example only and is not to be considered as a limitation on its scope.

What we claim is:

1. Data processing equipment including a store, an address decoder, a register for holding an address to be decoded by the decoder, a matrix of switches controlled by the decoder for routing access currents to the required store location, means for detecting an error in the address register or in the matrix, means for providing an alternative address, the alternative address being decoded in the same decoder as the original address, and means for selecting the same store location via the alternative address and an alternative current route.

2. Data processing equipment according to claim 1 wherein the error detecting means includes means for ascertaining whether the original or the alternative address has provided the correct decoded output and gating means for applying only the correctly decoded output to the matrix of switches controlled by the decoder.

3. Data processing equipment according to claim 1 wherein the error detecting means includes duplicate matrices of switches, each matrix being controlled by a separate decoder, one matrix and its associated decoder being responsive only to the original address, the other matrix and decoder being responsive only to the alternative address, each switch output is one matrix being coupled in parallel with a corresponding switch output in the other matrix to a common access to the store.

4. Data processing equipment according to claim 1 in which the binary digital data includes error detecting and correcting check elements, the equipment including means for detecting and locating an error in a code group by the use of the checking elements, means for inhibiting complementation of digits in error under the control of the checking means and means for complementing all the error free digits under the control of the checking means.

5. Data processing equipment according to claim 1 in which complementation of the binary digital information held in a bistable register is accomplished by providing a cross-connection from each of the two bistable outputs to the complementary input to the bistable and gating means in each cross-connection arranged to inhibit complementation if the information held in the bistable is in error.

6. Data processing equipment according to claim 5 in which the binary digital information includes check bits to form a Hamming code and in which the equipment includes means for error checking the contents of a register and means for generating a control signal arranged to control the inhibiting gating means of any digital element found to be in error.

7. Data processing equipment according to claim 1 wherein the error detecting means includes first and second digital data inverters connected in series with one output of a decoder address register bistable, means for detecting an error in the digital output of the first inverter and means for transferring the output of either inverter to the address decoder input.

References Cited

UNITED STATES PATENTS

| | | | |
|---|---|---|---|
| 2,849,532 | 8/1958 | Hennig | 178—23 |
| 3,222,653 | 12/1965 | Rice | 340—172.5 |
| 3,245,034 | 4/1966 | Steinbuch et al. | 340—146.1 |
| 3,353,155 | 11/1967 | Chien et al. | 340—146.1 |

PAUL J. HENON, *Primary Examiner.*

R. RICKERT, *Assistant Examiner.*